Figure 1:
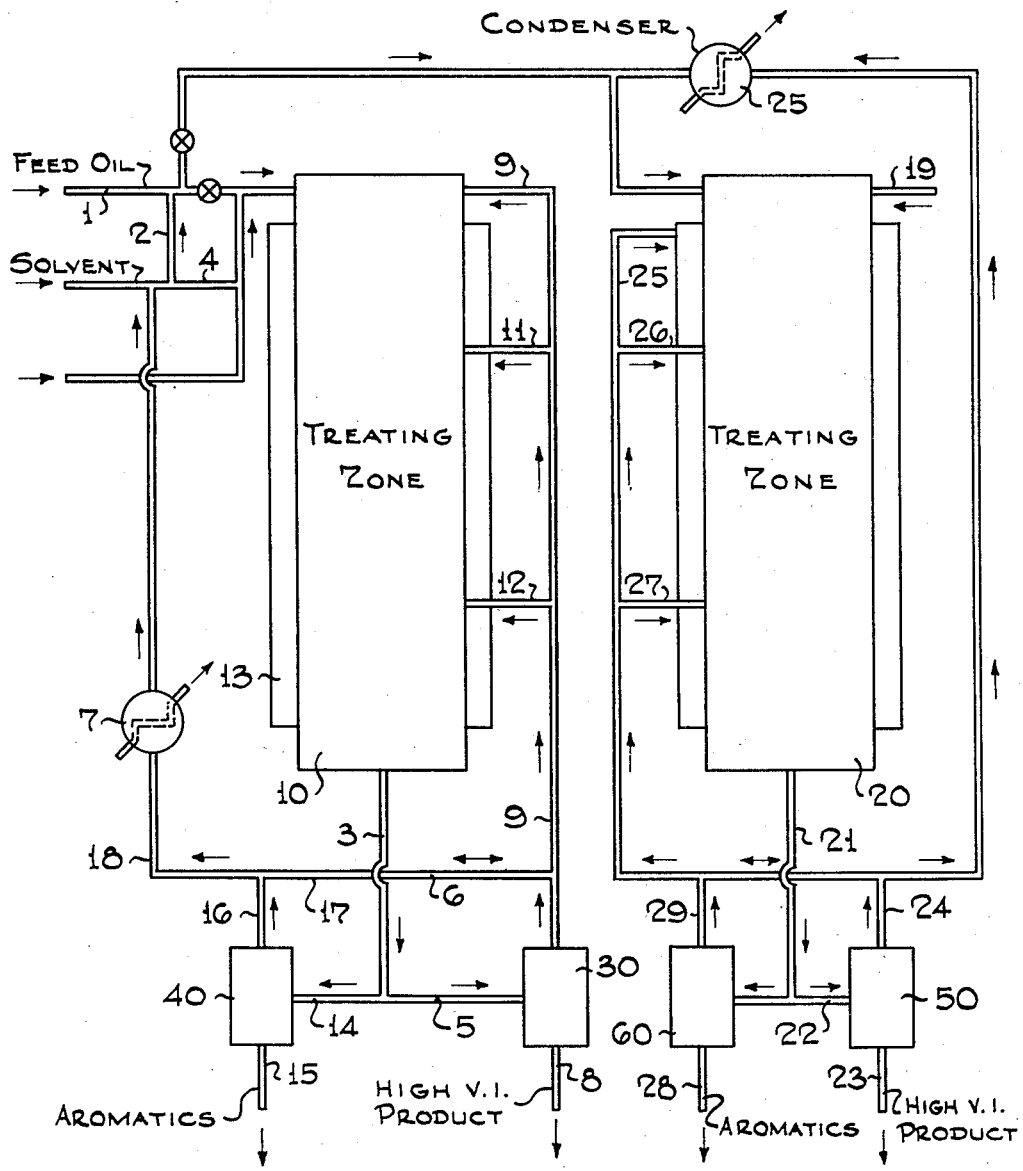

Insley P. Jones Inventor

Patented Oct. 30, 1951

2,572,866

UNITED STATES PATENT OFFICE 2,572,866

METHOD OF IMPROVING LUBRICATING OIL BY ADSORPTION ON SILICA GEL

Insley P. Jones, Oldwick, N. J., assignor to Standard Oil Development Company, a corporation of Delaware Application December 18, 1947, Serial No. 792,519

4 Claims. (Cl. 196—147)

The present invention is concerned with an improved process for the segregation of aromatic type compounds from non-aromatic type compounds. The invention is more particularly concerned with the production of high quality lubricating oils employing adsorbents such as silica gel or equivalents. The invention is specifically concerned with improved methods of regenerating these adsorbents which comprises treating the same at relatively high temperatures, particularly at or near the boiling point of the solvent utilized in the regeneration step.

It is known in the art to segregate various types of hydrocarbon constituents from other types of hydrocarbon constituents using solid adsorbents. For example, it is known that petroleum fractions may be separated into aromatic and non-aromatic fractions by selective adsorption with silica gel, activated charcoal, etc. The process utilized may involve complete adsorption of an oil on a relatively large quantity of the solid adsorbent, such as silica gel, which is contained in a treating zone or filter column. The solid adsorbent is then usually treated with a non-polar solvent, such as petroleum hydrocarbons having less than about 8 carbon atoms in the molecule. This treatment is effective in selectively desorbing certain of the adsorbed constituents. For example if a non-polar solvent such as normal heptane is employed as the treating agent, the normal heptane is removed from the treating zone along with paraffinic and naphthenic type constituents which have been desorbed and which may be subsequently segregated from the normal heptane. The adsorbed aromatic components which have not been desorbed by this treatment are subsequently removed from the solid adsorbent and recovered, usually by application of relatively large quantities of a polar solvent, such as methyl alcohol or an acetone-naphtha mixture. In the past, the recovery operations have been conducted at temperatures in the range from about 60 to 90° F. wherein maximum selectivity for the separation is obtained. Complete regeneration of the spent gel is effected by then subjecting it to relatively prolonged steaming at temperatures in the range from about 350 to 500° F. This serves to remove residual organic materials. The gel is then treated at 350–500° F. with a gas such as air or nitrogen, in order to reduce the moisture content and restore the gel to suitable adsorptive efficiency.

While these operations have been satisfactory, the regeneration of the gel is relatively expensive and in many instances prevents its use in commercial operations. I have, however, now discovered a process by which solid adsorbents may be readily regenerated and adsorbed paraffinic and aromatic constituents efficiently recovered. My invention comprises utilizing only non-polar solvents in the adsorption cycle and in the regeneration cycle. In accordance with my invention, I regenerate the adsorbent with a non-polar solvent, preferably with a paraffinic petroleum hydrocarbon having from about 5 to 8 carbon atoms in the molecule.

Figure 2:
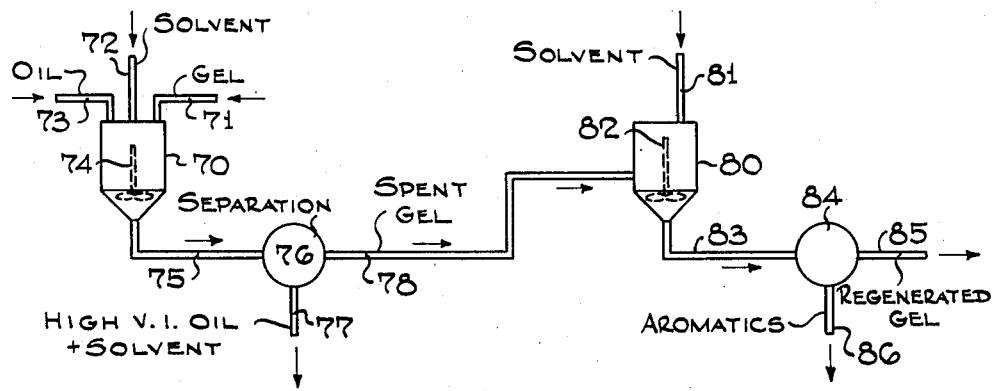
Figure 3:
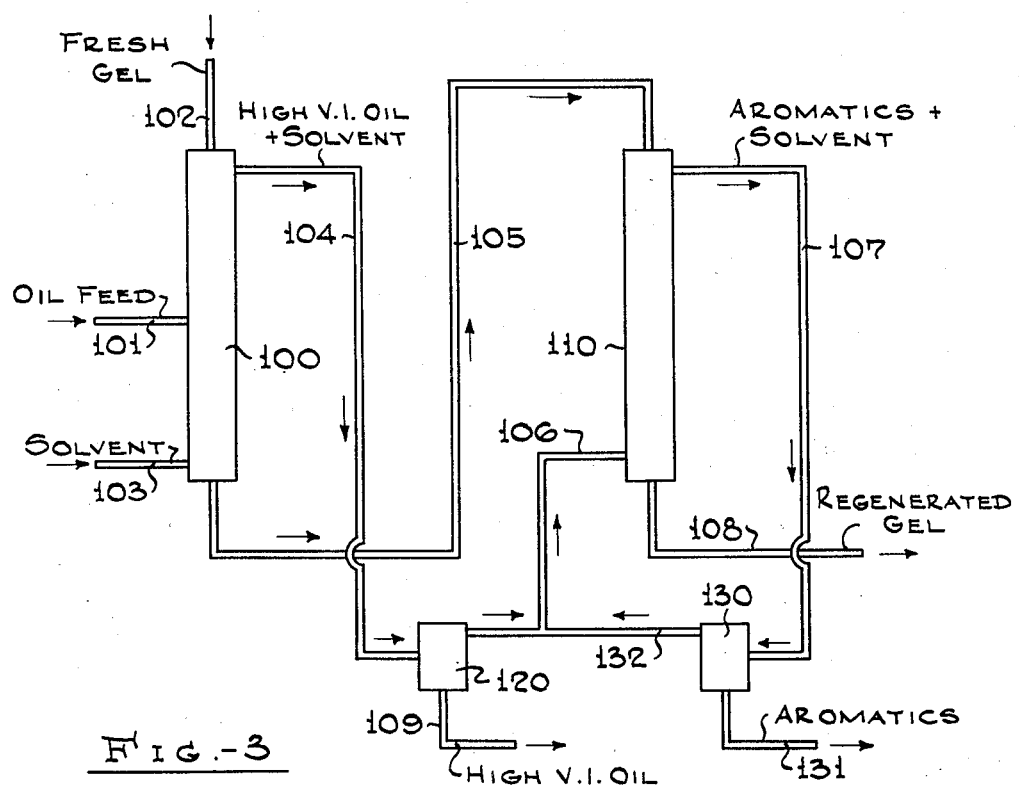

The process of my invention may be readily understood by reference to the drawings illustrating embodiments of the same. Figure 1 illustrates an operation employing a plurality of fixed beds. Figure 2 illustrates an adaptation of my invention wherein the solid adsorbent is passed through a treating zone and then through a regeneration zone, while Figure 3 illustrates a system wherein the solid adsorbent is maintained in a dispersed phase in the liquid mediums.

In the embodiment shown in Figure 1, the silica gel treating zone is operated in a three step cycle. During the first step, the absorption step, a feed oil is introduced to the silica gel zone so as to attain substantially complete adsorption of the feed oil by the silica gel. During the second step, the desorption step, a paraffinic wash solvent is introduced to the silica gel zone, desorbing paraffinic and naphthenic constituents of high viscosity index. During the third step, the regeneration step, hot paraffinic solvent at or near its boiling point is introduced to the silica gel zone, desorbing the remaining adsorbed constituents and regenerating the silica gel.

Referring specifically to Figure 1, feed oil, which for the purpose of illustration is assumed to be a light motor lubricant having a gravity in the range from about 28 to 34 degrees A. P. I. and boiling in the range from about 600 to 900° F., is introduced into treating zone 10 by means of feed line 1. Prior to introducing the feed oil into treating zone 10 the viscosity of the oil may be adjusted to the desired degree by diluting the feed oil with a non-polar solvent which is introduced into feed line 1 by means of solvent line 2.

The oil flows downwardly through treating zone 10 which contains a solid adsorbent which, for the purpose of description, is assumed to be silica gel. The silica gel may be any suitable type of silica gel and may be dispersed in treating zone 10 by any suitable means. For the purpose of illustration, it is assumed that the particle size of the silica gel in treating zone 10 is in the range from about 20 to 200 mesh. The flow of oil through treating zone 10 may be controlled by any known type of distributing and contacting means and baffles. Under the particular method of operating, as illustrated by Figure 1, feed is introduced into feed zone 10 until the silica gel in the zone is substantially completely saturated. At the point at which oil just begins to flow from zone 10 by means of line 3, the feed oil is no longer introduced into zone 10, but is handled as hereinafter described and is passed into treating zone 20. It is to be understood that if it is desired to treat the oil with a relatively large percentage of treat with respect to the silica gel, less oil may be introduced into treating zone 10. The temperature in the initial stage in treating zone 10 is in the general range from about 60 to 90 degrees F.

At this point, a non-polar solvent which is, for example, a paraffinic type solvent, the constituents of which have from about 5 to 8 carbon atoms in the molecule and which boils in the general range from about 100 to 250° F. and which is preferably the same solvent used to dilute the feed oil in the initial cycle, is introduced into treating zone 10 by means of line 4. For the purpose of illustration, it is assumed that the solvent comprises normal heptane. The normal heptane flows through treating zone 10 and is withdrawn by means of line 3 and is passed into distillation zone 30 by means of line 5. The normal heptane selectively desorbs the more paraffinic and naphthenic types of constituents and removes these from treating zone 10. These paraffinic type constituents are separated from the normal heptane and are recovered as a high V. I. product in distillation zone 30. The normal heptane is removed overhead from treating zone 30 by means of line 6, condensed in condensing zone 7 and preferably recycled to treating zone 10 by means of line 4.

When the viscosity index of the paraffinic type constituents recovered from treating zone 30 by means of line 8 decreases to a predetermined critical figure, the normal heptane removed overhead from treating zone 30 is preferably recycled to treating zone 10 as a vapor by means of line 9. In accordance with my invention, this treatment, which is effective in regenerating the silica gel in treating zone 10, is carried out by contacting the silica gel with a paraffinic type solvent in the liquid phase at a temperature at or near the boiling point of the solvent used.

Thus, in accordance with the embodiment of my invention, as illustrated in Figure 1, the vaporous n-heptane, at or near the boiling point of n-heptane, is introduced into the top of treating zone 10 by means of line 9. It is to be understood that the vapor may be introduced at a plurality of points to treating zone 10 by means of lines 11 and 12. Treating zone 10 is operated under conditions so that substantially complete condensation of the vaporous heptane is secured in the treating zone. This condition may be secured by any cooling or heating means, which is illustrated in the drawing by means of jacket 13.

The hot heptane containing dissolved aromatic constituents is removed from the bottom of zone 10 by means of line 3 and is introduced into distillation zone 40 by means of line 14. Temperature and pressure conditions are adjusted in zone 40 to recover aromatic type constituents by means of line 15 and to remove overhead from zone 40 by means of line 16, vaporous heptane. The vaporous heptane is preferably recycled to zone 10 by means of lines 17, 6 and 9 as hereinbefore described.

When the regeneration of the silica gel has been accomplished to the desired degree of efficiency, the vaporous heptane removed from zone 40 is passed through condensing zone 7 by means of line 18 and may be handled in any manner desirable. In general, it is preferred to employ at least a portion of the same as a diluent for the feed oil.

Prior to reintroducing the feed oil into treating zone 10, the silica gel is cooled to a temperature in the range from about 60 to 90 degrees by any suitable means. In general, it is preferred to recycle the normal heptane through treating zone 10 and condensing zone 7 in order to remove the heat.

Treating zone 20 operating in conjunction with treating zone 10 operates in a similar manner. Zone 20 is employed when the feed oil is no longer introduced into treating zone 10. For example, when the feed oil is no longer introduced into the treating zone 10 at the end of the adsorption cycle for zone 10, it is passed to treating zone 20 to initiate the beginning of the adsorption cycle for treating zone 20. At the end of the adsorption cycle for treating zone 20, the feed oil may again be passed to treating zone 10 or passed to another zone operating in conjunction with zones 10 and 20 to start the adsorption cycle for said other zone. At the end of the adsorption cycle in zone 20, the washing solvent is introduced into the top of zone 20 by means of solvent line 19. The solvent, for the purpose of illustration, comprises normal heptane. This solvent flows downwardly through treating zone 20 and preferentially desorbs paraffinic and naphthenic type hydrocarbons. During this cycle the normal heptane containing paraffinic type hydrocarbons is removed from zone 20 by means of line 21 and is introduced into distillation zone 50 by means of line 22. Temperature and pressure conditions are adjusted in zone 50 to remove by means of line 23 paraffinic type constituents and to remove overhead by means of line 24 the normal heptane. This normal heptane is passed to condensing zone 25 and is preferably recycled to the top of zone 20.

When the paraffinicity of the hydrocarbons recovered by means of line 23 has decreased to a predetermined critical figure, the normal heptane removed overhead from zone 50 is recycled in the vaporous phase to treating zone 20 to initiate the start of the regeneration cycle. As pointed out, heretofore, the vapors may be introduced at a plurality of points into zone 20 by means of lines 25, 26 and 27. The normal heptane containing dissolved aromatic type constituents is withdrawn from zone 20 by means of line 21 and is introduced into distillation zone 60 wherein temperature and pressure conditions are adjusted to remove aromatic type constituents by means of line 28 and to remove overhead by means of line 29 the normal heptane.

Referring now to Figure 2, which illustrates an adaptation of my process to a batch contacting process, silica gel is introduced into mixing zone 70 by means of line 71. Solvent is introduced into zone 70 by means of line 72 while the feed oil is introduced by means of line 73. Mixing in zone 70 is secured by any suitable means, as for example, by stirrer 74. The mixture is withdrawn from zone 70 by means of line 75 and is passed to filtering or equivalent separation means 76. The paraffinic type constituents along with the solvent are withdrawn by means of line 77 from separation means 76 and handled in a manner to segregate the solvent and the high viscosity oil. The spent gel is withdrawn from rotary filter 76 by means of line 78 and is passed to a regeneration zone 80. Solvent, which for example is assumed to be normal heptane at approximately 200° F., is introduced into zone 80 by means of line 81. Mixing of the silica gel and solvent is secured by any mixing means, which for the purpose of illustration, is assumed to be stirrer 82. The mixture is withdrawn from zone 80 by means of line 83 and is passed to separation means 84 wherein the solvent and the aromatic type constituents are segregated from the regenerated silica gel. The regenerated gel is withdrawn from zone 84 by means of line 85 and is preferably recycled to zone 70. The solvent and the aromatics are withdrawn from filtering means 84 by means of line 86 and are handled in a manner to segregate the aromatic type constituents from the solvent. As discussed heretofore, the solvent employed in zone 80 and in zone 70 comprises a non-polar solvent and is preferably the same solvent.

Referring now to Figure 3, which illustrates an adaptation of my invention wherein the silica gel is maintained in the dispersed phase in the treating mediums, oil feed is introduced into treating zone 100 by means of feed line 101. The oil flows upwardly through zone 100 and contacts downflowing silica gel which is introduced into zone 100 by means of line 102. A solvent which comprises a non-polar solvent and which, for the purpose of illustration, is assumed to be normal heptane, is introduced into zone 100 by means of line 103. A high viscosity index oil and solvent is removed from zone 100 by means of line 104 and is handled by any suitable means to segregate the oil and solvent. The silica gel containing adsorbed aromatic type constituents is removed from zone 100 by means of line 105 and is introduced into the top of recovery zone 110. Hot solvent, which for the purpose of illustration is assumed to be normal heptane, is introduced into the bottom of zone 110 by means of line 106. This solvent flows upwardly and countercurrently contacts downflowing silica gel in zone 110. The solvent, together with desorbed aromatic type constituents, is removed from zone 110 by means of line 107 and is handled to segregate the aromatic type constituents from the solvent. The silica gel, substantially completely free of hydrocarbon constituents, is removed from zone 110 by means of line 108 and is preferably recycled to zone 100.

The high viscosity index oil and solvent removed from zone 100 by means of line 104 is introduced into recovery zone 120 wherein the high viscosity index constituents are segregated by means of line 109. The solvent is removed overhead by means of line 106 and is introduced into zone 110 as hereinbefore described. In a similar manner the aromatic type constituents and solvent removed by means of line 107 from zone 110 is introduced into distillation zone 130 wherein the aromatic type constituents are segregated by means of line 131 and the solvent by means of line 132 which latter stream is recycled to zone 110.

My invention may be further understood by the following examples illustrating various embodiments of the same.

EXAMPLE I

A light motor lubricant having an A. P. I. gravity of about 32 degrees was diluted with an equal volume of normal heptane. This mixture was completely adsorbed on 440 weight percent of fresh silica gel in a filter column at 85° F. The silica gel was then treated with an additional 5 volumes of normal heptane. This latter heptane wash removed 62% of the oil charged to the silica gel, which constituents were substantially all non-aromatic materials. The gel containing the aromatic materials was segregated into 5 parts and extracted with various polar and non-polar solvents at their respective boiling points. The resultant gel products were dried at 250° and inspected for their aromatic adsorption index, which indicates the efficiency of regeneration, the following results as compared to fresh silica gel:

|  | A. A. I. | Efficiency, Wt. Per Cent |
|---|---|---|
| Fresh Gel | 117 | 100 |
| Solvent Used: | | |
| n-heptane (209° F.) | 112 | 96 |
| methyl alcohol (151° F.) | 113 | 97 |
| 60/40 acetone-Naphtha | 115 | 98 |
| Benzene (183° F.) | 113 | 97 |

A fifth portion of the gel was washed at 85° F. with a similar quantity of the 60/40 blend of acetone-naphtha followed by steaming at 400° F. and blowing with nitrogen at 400° F. The resulting product showed an aromatic adsorption index of 95, representing 81% efficiency.

In the above data it is apparent that normal heptane, a non-polar solvent, may be readily employed in accordance with my process for the regeneration of spent silica gel.

EXAMPLE II

In a more extended test a light lubricating oil was extracted with silica gel in successive cycles of adsorption and regeneration, the same solvent being employed throughout for initial dilution, non-aromatic product recovery, and gel regeneration under controlled temperature conditions. The following conditions were employed in conventional percolation equipment.

*Adsorption conditions*

Charge stock: Light lubricating oil, 78 V. I.
Gel treat: 440 Wt. % of 28–200 mesh silica gel.
Initial oil dilution: 100 vol. % of n-heptane based on oil charge.
Primary wash: 400 vol. % of n-heptane based on oil charge.
Temperature: 85° F.

*Regeneration conditions*

Wash: n-heptane, 2 v./v. based on gel or 1270 vol. % based on lube charge.

| Regeneration Temperature | 85° F. | | | | 200° F. | | | |
|---|---|---|---|---|---|---|---|---|
| Cycle No | 1 | 2 | 3 | 4 | 1 | 2 | 3 | 4 |
| V. I. of non-aromatic fraction at 60% yield | 115 | 109 | 105 | 104 | 115 | 111 | 113 | 112 |

The advantage of employing an elevated temperature for the regeneration cycle is amply illustrated by the continued high product quality obtained on successive adsorption cycles.

In a similar run conducted at 180° F. throughout with no dilution of the oil charge, the following data were obtained:

| Cycle No | 1 | 2 | 3 | 4 | 5 | 6 |
|---|---|---|---|---|---|---|
| V. I. of non-aromatic fraction at 60% yield | 110 | 110 | 100 | 106 | 102 | 101 |

These data indicate that although fairly high gel efficiency was maintained in successive cycles the non-aromatic product quality was not as good as obtained when using an 85° F. adsorption temperature. For maximum advantage, therefore, temperature should be elevated only for the regeneration step.

EXAMPLE III

In a further series of experiments spent gel was stripped with n-heptane or acetone-naphtha in the vapor phase at temperatures of 300-400° F. The gel products, however, showed only 50-65% efficiency as compared to fresh gel, thus indicating a definite advantage for solvent application in the liquid phase.

My invention is broadly directed toward the regeneration of solid adsorbents by treating the same with non-polar solvents in the liquid phase at their boiling points. It is to be understood, however, that it is within the scope of my invention to treat at temperatures somewhat above the boiling point, as for example, 25 or 50 degrees above the boiling point, so long as the system is maintained in the liquid phase.

The solvents in general comprise non-polar solvents, as for example, paraffinic type hydrocarbons or narrow boiling alkylate fractions. In general, it is preferred that the hydrocarbons contain from about 3 to 10, preferably from 5 to 8 carbon atoms in the molecule and boil in the general range from about 100° F. to 300° F.

My process is particularly directed toward the regeneration of silica gel employed in the treatment of petroleum oils for the segregation of relatively more paraffinic constituents from relatively less paraffinic constituents. Preferred feed oils are those oils boiling in the lubricating oil boiling range, as for example, in the range from about 600° F. to 900° F. and having A. P. I. gravity in the range from about 24 to 36 degrees.

In general, the operation is conducted at atmospheric pressures although if temperatures slightly above the boiling points of the particular solvent are used, somewhat higher pressures will be necessary in order to maintain the solvent in the liquid phase. For example, as in Example I, normal heptane was employed to regenerate silica gel. Pressures of 50 pounds p. s. i., and 85 pounds p. s. i., were employed rather than the atmospheric pressure employed in Example I; the treating temperatures were then 300° F. and 350° F., respectively. These temperatures were substantially at the boiling point of the normal heptane under the conditions of pressure specified. It was found that the regeneration was as effective at the higher pressures as at atmospheric pressure, and furthermore it was unexpectedly discovered that less normal heptane was required to secure equivalent regeneration of the gel. At both high pressure runs it was found that 1½ volumes of normal heptane per volume of silica gel was as effective as 2 volumes of normal heptane per volume of silica gel employed at atmospheric pressure. It is, therefore, contemplated that regeneration according to this invention may be conducted at pressures in the range of 1 to 10 atmospheres, at the temperature substantially corresponding to the boiling temperature of the desorbent at the particular pressure employed.

Having now fully described my invention, I claim:

1. A silica gel lubricating oil treating process in which lubricating oil diluted with a paraffinic hydrocarbon containing from about 3 to 10 carbon atoms and boiling in the range of about 100 to 300° F. is substantially adsorbed on silica gel by contact therewith, subsequent to said contacting washing the silica gel and adsorbed oil components with said paraffinic hydrocarbon whereby paraffinic and naphthenic constituents of high viscosity index are desorbed from the silica gel, fractionating high viscosity index constituents from the wash paraffinic hydrocarbon by distillation removing the said paraffinic hydrocarbon as an overhead product, and thereafter recycling said overhead product to the said silica gel contacting the silica gel in liquid phase at about the boiling point of the paraffinic hydrocarbon, whereby the said silica gel is regenerated.

2. The process defined by claim 1 in which the said paraffinic hydrocarbons is n-heptane.

3. In a silica gel lubricating oil treating process in which the lubricating oil is diluted with a paraffinic hydrocarbon containing from 3 to 10 carbon atoms and boiling in the range of about 100 to 300° F., the steps which comprise contacting silica gel with the said diluted lubricating oil, whereby substantially all of said oil is adsorbed by the silica gel, washing said silica gel with said paraffinic hydrocarbon at about ambient temperatures whereby paraffinic and naphthenic constituents of high viscosity index are desorbed from the silica gel, withdrawing said wash paraffinic hydrocarbon and said desorbed constituents and segregating the high viscosity index constituents from the paraffinic hydrocarbon by distillation providing a vaporous overhead stream of paraffinic hydrocarbon, subsequently condensing said overhead paraffinic hydrocarbon and contacting the said treated silica gel with the condensed paraffinic hydrocarbon whereby low viscosity index constituents are desorbed from the silica gel, and finally contacting the said treated silica gel with vapors of the said paraffinic hydrocarbon to secure the condensation of the said vapors and the contact of the silica gel with the paraffinic hydrocarbon in liquid phase at about the boiling point of the paraffinic hydrocarbon.

4. The process defined by claim 3 in which the said paraffinic hydrocarbon is n-heptane.

INSLEY P. JONES.

REFERENCES CITED

The following references are of record in the file of this patent:

UNITED STATES PATENTS

| Number | Name | Date |
|---|---|---|
| 2,384,311 | Kearby | Sept. 4, 1945 |
| 2,395,491 | Mavity | Feb. 26, 1946 |
| 2,398,101 | Lipkin | Apr. 9, 1946 |
| 2,415,315 | Walter et al. | Feb. 4, 1947 |
| 2,441,572 | Hirschler et al. | May 18, 1948 |
| 2,464,311 | Hiatt et al. | Mar. 15, 1949 |
| 2,470,339 | Claussen et al. | May 17, 1949 |